P. SMITH.
GARDEN CULTIVATOR.
APPLICATION FILED JULY 22, 1913.
1,102,097.
Patented June 30, 1914.
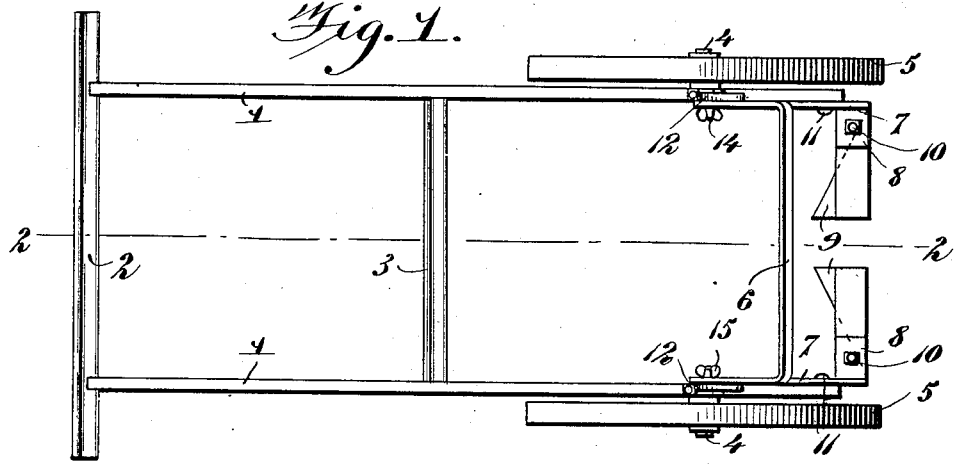
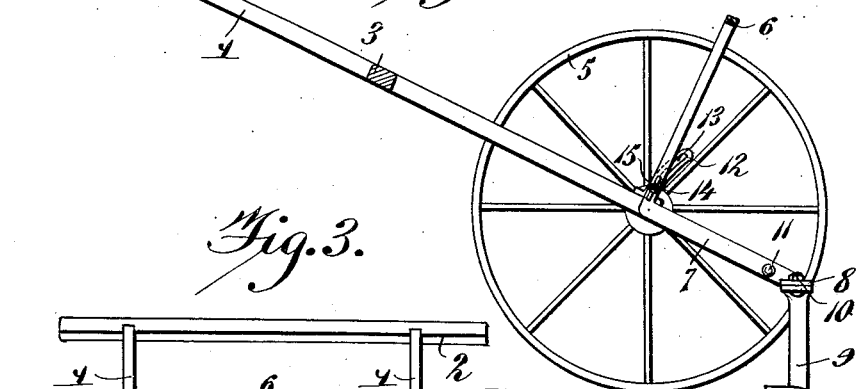
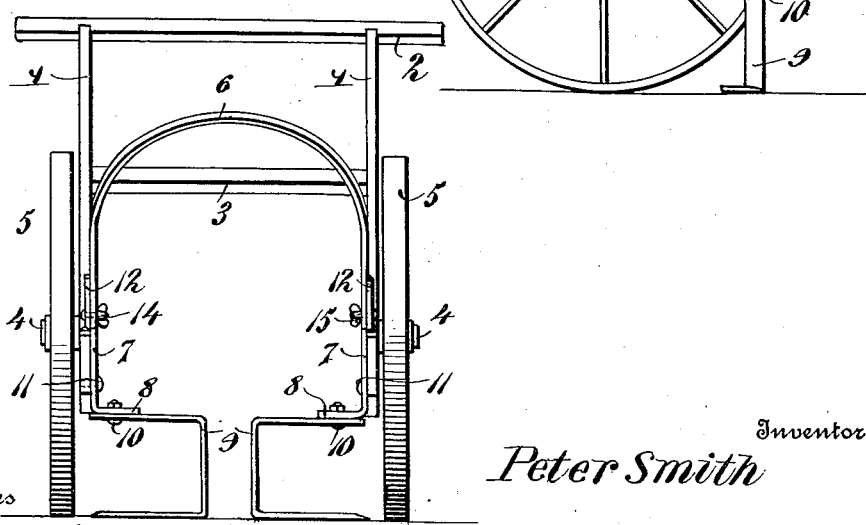

UNITED STATES PATENT OFFICE.

PETER SMITH, OF NEW TROY, MICHIGAN.

GARDEN-CULTIVATOR.

1,102,097.

Specification of Letters Patent. Patented June 30, 1914.

Application filed July 22, 1913. Serial No. 780,554.

*To all whom it may concern:*

Be it known that I, PETER SMITH, a citizen of the United States, residing at New Troy, in the county of Berrien and State of Michigan, have invented new and useful Improvements in Garden-Cultivators, of which the following is a specification.

This invention relates to garden cultivators of that class which are adapted to straddle a row of growing plants and which may be equipped with means for cultivating or agitating the soil adjacent to the plants.

The object of the invention is to produce a device of the class described of simple and improved construction which will permit of the earth engaging implements being readily applied or detached, as may be required.

A further object of the invention is to produce a device of the character described wherein the arch frame which carries the ground engaging tools may be readily adjusted so as to tilt the tools to the most advantageous angle for engaging the ground.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view. Fig. 2 is a longitudinal sectional view taken on the line 2—2 in Fig. 1. Fig. 3 is a front end view.

Corresponding parts in the several figures are denoted by like characters of reference.

The main frame of the improved implement is composed of side bars 1, 1 which are connected together at their rear ends by a handle bar 2 and intermediate their rear and front ends by a cross bar 3. The side bars 1 are provided with stub axles or spindles 4 on which supporting wheels 5 are journaled.

An auxiliary frame is provided comprising an arch 6, the limbs of which are provided at their lower ends with forward extensions or side members 7, which latter are provided at their front ends with laterally extending offsets or brackets 8 on which ground engaging tools 9 of any suitable kind may be detachably secured by fastening members, such as bolts 10. The side members 7 of the arch frame are connected with the side bars 1 of the main frame, intermediate the ends of the latter, by pivot members such as bolts 11. The rear ends of the side members 7 are by preference connected adjustably with the main frame which latter for this purpose is provided with arcuate brackets 12 secured on and extending upwardly from the side bars 1, said brackets being provided with slots 13 that are concentric with the pivot members 11 for the passage of clamp bolts 14 which also extend through the side members 7 of the arch frame, said bolts being provided with wing nuts 15 for the purpose of securing the parts in adjusted position. It will be very evident that by loosening the wing nuts 15 the arch frame may be tilted about the axis of the pivot members 11 to an extent which is limited by the length of the slots 13. By tightening the wing nuts, the parts will be firmly secured in adjusted position. By thus tilting the arch frame, it is evident that the angle of the earth engaging tools with respect to the surface of the ground may be changed for the purpose of presenting the tools in the most advantageous position for successful operation.

The arch frame, in addition to adjustably supporting the ground engaging tools, serves to connect the side members 1 of the main frame, and the arch also affords ample clearance space for the plants that are to be operated upon.

In operation, the device may be pushed forwardly by the handle bar by means of which the machine will also be guided in such a manner that the ground engaging tools will operate adjacent to the two sides of the row for the purpose of performing their desired operation without disturbing the plants. The construction of the improved device is simple and inexpensive, and it has been found thoroughly efficient for the purposes for which it is provided.

Having thus described the invention, what is claimed as new, is:—

1. In a garden cultivator, a main frame comprising side bars, a handle bar connecting said side bars at their rear ends and a cross bar connecting the side bars intermediate their ends, stub axles on said side bars, and wheels journaled on said stub axles, in combination with an auxiliary frame including an arch, the limbs of which are provided at their lower ends with forwardly extending side members having laterally extending offsets, and means for adjustably securing the side members of the arch frame on the side bars of the main frame.

2. In a garden cultivator, a main frame comprising side bars, a handle bar connecting said side bars at their rear ends and a cross bar connecting the side bars intermediate their ends, stub axles on the side bars, and transporting wheels journaled on the stub axles, in combination with an auxiliary frame including an arch, the limbs of which are provided at their lower ends with forwardly extending side members having laterally extending offsets, pivot members whereby the side members of the auxiliary frame are mounted on the side bars of the main frame near the front end of the latter, arcuate brackets secured on the side bars of the main frame and having slots concentric with the pivot members, and clamp bolts adjustable in the slots and engaging the side members of the auxiliary frame; and earth engaging tools detachably mounted on the lateral offsets of the side members of the auxiliary frame.

In testimony whereof I affix my signature in presence of two witnesses.

PETER SMITH.

Witnesses:
ALICE PLETCHER,
HENRY PLETCHER.

Copies of this patent may be obtained for five cents each, by addressing the "Commissioner of Patents, Washington, D. C."